Dec. 9, 1958   G. A. M. PETERSEN   2,863,640
OFFSET BORING HEAD FOR AUGER
Filed Nov. 18, 1955
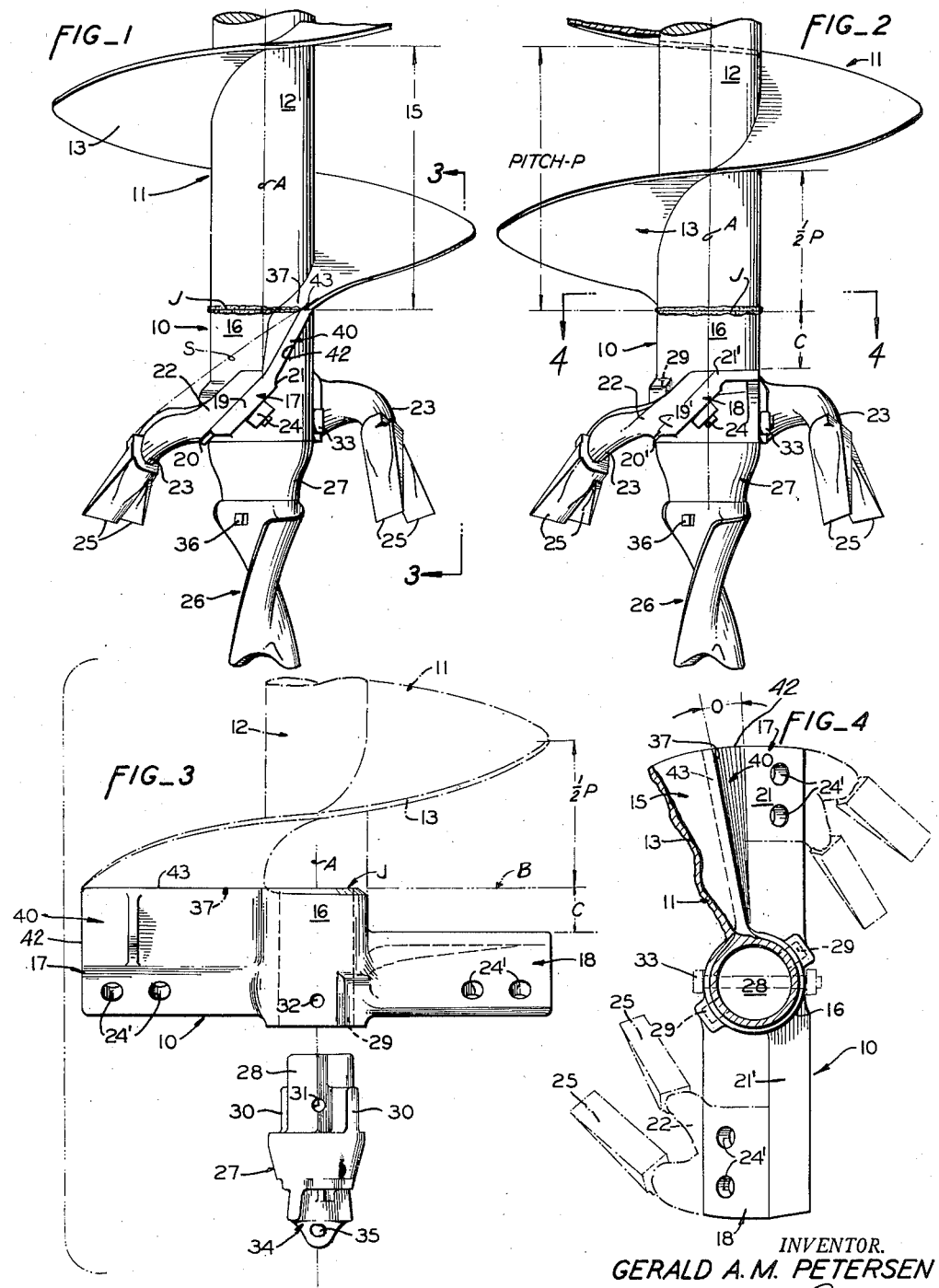
INVENTOR.
GERALD A. M. PETERSEN
BY
Hansen and Lane
ATTORNEYS

United States Patent Office 2,863,640
Patented Dec. 9, 1958

2,863,640

OFFSET BORING HEAD FOR AUGER

Gerald A. M. Petersen, Santa Clara, Calif.

Application November 18, 1955, Serial No. 547,698

6 Claims. (Cl. 255—69)

This invention relates to earth boring augers and more particularly to an offset boring head therefor.

As is well known an auger constitutes a radially extending blade wound spirally about a drive or drill shaft in a manner to provide a spiral path for conveying spoil or drilled material upwardly and away from the leading or cutting end of the auger. In earth boring augers the diameter thereof is usually quite large and consequently the blades of the auger are built up from sections each formed from a blank disc of steel. These discs are provided with a central hole adapted to fit the drill shaft. Each disc is severed along a radial line so that the plate steel can be distorted or shaped into a helix whereby the severed ends are spaced vertically from each other at the desired pitch, preferably one half the diameter of the distorted discs or auger, for elevating the spoil in the auger.

The lower edge of one of these helical segments is usually the cutting edge of a small bore auger. However, in earth boring augers and augers of larger diameter the actual cutting is implemented by a bladed or toothed cutting head especially constructed for that purpose. Such cutting head is secured to the lower or leading end of the auger as by welding. Since in boring earth heavy clay and rock may be encountered it is best to use a multiple cutting head as distinguished from a mere radial cutting edge on an auger to achieve what is known as balanced cutting. In this manner the earth clods, clay and rock are loosened and broken up preliminary to admission thereof onto the spiral track or blade of the auger. By the same token the tendency for the auger to drive in corkscrew fashion into earth is eliminated by the multiple type cutting head.

The present invention has as one of its objects the provision of a boring head with diametrically disposed radial arms one of which is adapted for connection directly to the lower end of the radial track or blade on the auger. In relation to the foregoing it is a further object to provide an offset web on that arm of the boring head facilitating connection thereof to the leading radial edge of the auger blade for the purpose of providing sufficient clearance between the opposite arm of the boring head and that portion of the auger blade winding spirally above it to assure against compression or binding of the spoil loosened by the cutting head.

These and other objects and advantages of the present invention will become apparent from a reading of the following description and claims in the light of the drawing in which:

Fig. 1 is a side elevation of an auger and offset boring head embodying the present invention.

Fig. 2 is a view similar to that of Fig. 1 and taken from the opposite side thereof.

Fig. 3 is an elevational view of the offset boring head only of Fig. 1 taken substantially from line 3—3 thereof and showing the adapter lug dismantled therefrom and the auger in phantom.

Fig. 4 is a horizontal section of Fig. 2 as seen from line 4—4 thereof.

Referring to Figs. 1 and 2, the invention is embodied in the novel construction and arrangement of a boring head 10 with an auger 11. As previously stated the auger consists of a central drive or drill shaft 12 about which a continuous single helical blade 13 spirally winds for conveying loose earth, rock, etc., hereinafter referred to as spoil, upwardly and out of the hole being bored. We are here especially concerned with the lower first convolute, flight or segment 15 of the spiral blade 13 within one pitch P of the helix formed by the spiral blade.

The boring head 10 is a casting comprising a hub portion 16 from which a pair of radial arms 17 and 18 extend diametrically opposite relative to each other. The major portions 19—19' of each of these arms 17—18, respectively, are substantially identical to each other, and are disposed diagonally relative to the axis A of the drill shaft 12 and hub 16 each with its lower edge 20—20' in a leading position relative to the direction of turning of the auger when boring into earth.

It should here be noted that the leading edges 20—20' of the boring head 10 might well be sharpened for purposes of cutting into the earth. However, in the present disclosure I have shown the two radial arms 17—18 to consist of levers for supporting shank plates 22 each of which is provided with two or more shanks 23 for receiving and supporting a cutting tooth 25 in a position to facilitate its direct cutting, biting or chipping into earth for loosening the same up for discharge via the spiral blade 13 of the auger. I prefer that the shank plates and tooth arrangement follow the teachings of my U. S. Letters Patent No. 2,578,014, dated December 11, 1951.

As shown in Figs. 1 and 2, each shank plate 22 is secured to its respective supporting arm 17 or 18 by bolts 24 extending through holes 24' provided in the arms.

The lower end of the hub portion 16 is provided with a pilot bit 26. In the present disclosure the pilot bit is shown as detachable relative to the main body of the boring head 10. This is accomplished through the medium of an adapter 27 having a key shank 28 on its upper end shaped to fit into the hollow center of the hub 16. In this connection the hub portion 16 is provided with diametrically opposed keyways 29 for receiving like disposed key lugs 30 formed on the key shank 28. In addition to the foregoing, both the key shank 28 and hub portion 16 is provided with a small bore 31—32, respectively, which align with each other for the reception of a bolt 33. This assures withdrawal of the adapter 27 when the auger is withdrawn from the earth.

The pilot bit 26 may be of any desired form but I prefer that it be of the fish tail type such as described and claimed in my co-pending U. S. application, Serial No. 414,007 filed March 4, 1954, and issued December 11, 1956, as U. S. Patent No. 2,773,673. This pilot bit includes a main body provided with a socket for receiving a lug 34 (Fig. 3) formed on the lower end of the adapter 27. This lug 34 is provided with a hole 35 in alignment with holes on either side of the pilot bit for receiving a bolt 36. In this manner the pilot bit 26 is secured to the adapter 27 for withdrawal from earth.

From the foregoing it will be apparent that upon drilling into earth the pilot bit 26 as well as the cutting teeth 25 on both arms 17—18 of the cutting head loosen up the earth and tend to raise the spoil thus loosened upwardly toward the auger 11.

Referring to Fig. 1, it will be noted that the lower, major portion 19 of the main cutter arm 17 of the balanced, offset boring head 10 is practically identical to the major portion 19' of the other or balancing arm 18. Moreover, each of these portions 19 and 19' have their upper edges at a common horizontal plane. However, instead of being connected directly to the lower end of the first flight 15 of the helical auger 13, which is at line B in Fig. 3, as in prior boring heads, the main cutter arm portion 19 and its identical, and diametrically opposite, counterpart 19' of the balancing arm 18 are offset downwardly from the lower edge or line B of the blade 13 by a substantial distance C (Figs. 2 and 3) while being offset rotatively about the axis of the head in the direction of auger rotation during a boring operation by only a small segmental angle O (Fig. 4).

A ramp portion 40 which is formed integrally with the major cutter arm portion 19 is adapted to be connected along its upper edge to the lower end of the auger blade 13. Thus it will be seen that the ramp 40 is disposed at a sharp, downward angle relative to the lower end portion of the auger blade 13, and tends to elevate the spoil loosened by the cutting action of the cutter arms 17 and 18 onto the lower end of the helical blade 13.

It will be obvious from Fig. 3 that if no offset such as the spacing C (Fig. 3) were provided, and the main cutter arm portion 19 were welded directly to the lower end of the auger blade 13, the upper edge of portion 19' of the balancing arm 18 would be at the level of the projected broken line B (Fig. 3). In such event, the clearance between the line B and the auger blade 13 directly thereabove would only be ½ P (one half the pitch of the helical blade 13). However, by means of the present invention, the clearance of the balancing arm portion 19' from the auger blade 13 directly thereabove is increased by the net downward offset of the arm portions 19 and 19' from the helix defined by the blade 13. This net downward offset is, of course, the overall height C (Figs. 2 and 3) of the ramp 40, minus the amount of downward advance of the blade helix through the ramp angle O (Fig. 4). For this reason, it is obvious that the downward angle of the ramp 40 should be steep, so that its angular extent O will be small relative to its height.

Thus it will be appreciated that the offset boring head 10 of the present invention provides a balanced cutter arm boring head in which both cutter arms are of full radial length to afford equal or balanced torque for use on a single screw blade auger, and yet provide vertical clearance from the balancing cutter arm to the auger blade directly thereabove of substantially more than ½ P.

While I have described my new arrangement of an offset boring head for augers in specific detail it will be appreciated that variations, alterations and/or modifications may be made without departing from the spirit of the invention. I therefore desire to avail myself of all variations, alterations and/or modifications as fairly come within the purview of the appended claims.

What I claim as my invention and desire to protect by Letters Patent is:

1. An auger comprising a drive shaft, a helical blade extending spirally upward from its lower end about said drive shaft, a pair of balanced cutting arms of substantially equal length extending substantially diametrically from said shaft below the lower end of the blade, and a ramp-like web attached to one of said arms having its upper end secured to the lower end of the blade in a plane substantially higher than the upper edge of the other of said arms, said web having a slope greater than that of the blade, thereby providing greater than one-half pitch clearance between the upper edge of said other arm and that portion of the blade directly above it.

2. An auger comprising a drive shaft, a helical blade extending spirally upward from its lower end about said drive shaft at a pitch of approximately one-half the overall diameter of said blade, a pair of balanced cutting arms of substantially equal length extending substantially diametrically from said drive shaft below the lower end of the blade, and a ramp-like web attached to one of said arms having its upper end secured to the lower end of the blade in a plane substantially higher than the upper edge of the other of said arms, said web having a slope greater than that of the blade, thereby providing greater than one-half pitch clearance between the upper edge of said other arm and that portion of the blade directly above it.

3. A boring head for the lower end of an auger of the type having a helical blade extending spirally upward from its lower end about a drive shaft, said boring head comprising a hub portion adapted to be connected to the lower end of said drive shaft, a pair of cutting arms of substantially equal length extending substantially diametrically from said hub portion, and a ramp-like web having its lower edge connected to one of said arms and extending upwardly therefrom in the direction of the slope of said blade and at a sharply steeper angle than the pitch inclination of said blade to terminate in an upper edge adapted to be connected to the lower edge of said blade on a radius of said shaft substantially higher than the upper edge of said other arm, thereby providing more than one-half pitch clearance between said other arm and that portion of the blade above it.

4. A boring head for the lower end of an auger of the type having a helical blade extending spirally upward from its lower end about a drive shaft, said boring head comprising a hub portion adapted to be connected to the lower end of said drive shaft, a pair of cutting arms of substantially equal length extending substantially diametrically from said hub portion and in planes forming oblique angles with the axis of said hub portion, with the leading edges of the arms lowermost, and a ramp-like web integral with one of said arms and extending upwardly therefrom in the direction of slope of said blade and at a sharply steeper angle than the pitch inclination of said blade and terminating in an upper edge adapted to be connected to the lower edge of said blade on a radius of said hub portion higher than the upper edge of said other arm, thereby providing more than one-half pitch clearance between said other arm and that portion of the blade above it.

5. The combination claimed in claim 4 in which said cutting arms are provided with cutting teeth projecting forwardly therefrom.

6. The combination claimed in claim 4 in which said cutting arms are provided with an equal number of cutting teeth projecting at substantially the same angle forwardly therefrom.

References Cited in the file of this patent

UNITED STATES PATENTS

| | | |
|---|---|---|
| 2,239,461 | Mann | Apr. 22, 1941 |
| 2,680,597 | Brown | June 8, 1954 |